Figure 1:
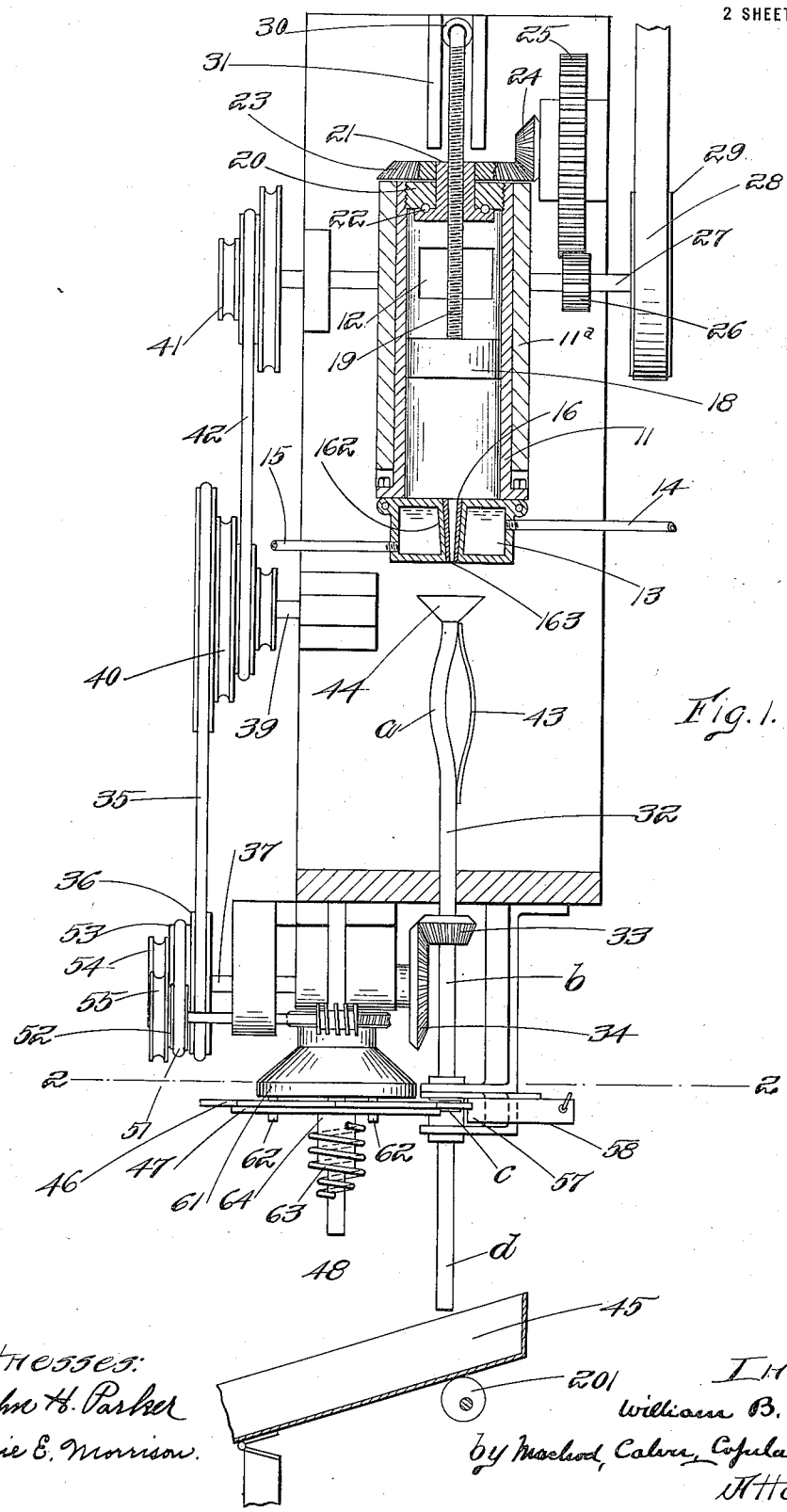

W. B. LASKEY.
CANDY MAKING MACHINE.
APPLICATION FILED APR. 5, 1912.

1,142,893.

Patented June 15, 1915.
2 SHEETS—SHEET 1.

Witnesses:
John H. Parker
Jessie E. Morrison

Inventor:
William B. Laskey
by MacLeod, Calver, Copeland & Dike
Attorneys.

W. B. LASKEY.
CANDY MAKING MACHINE.
APPLICATION FILED APR. 5, 1912.
1,142,893.
Patented June 15, 1915.
2 SHEETS—SHEET 2.
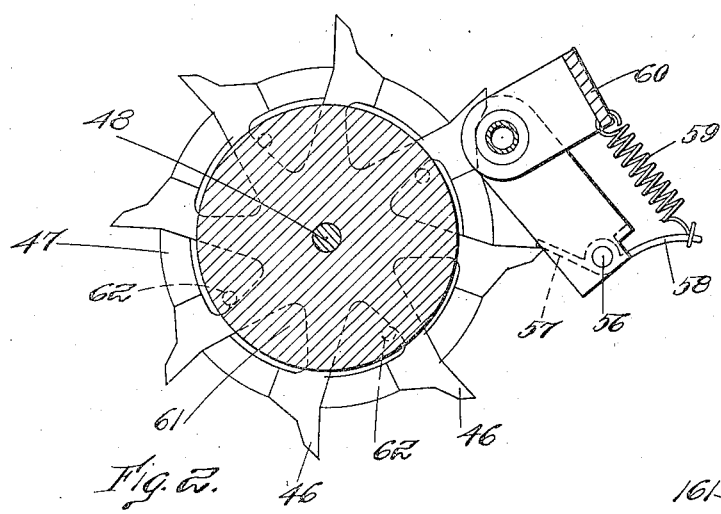
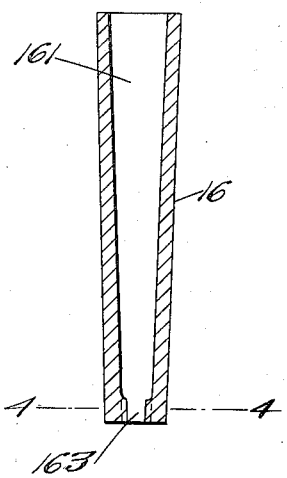
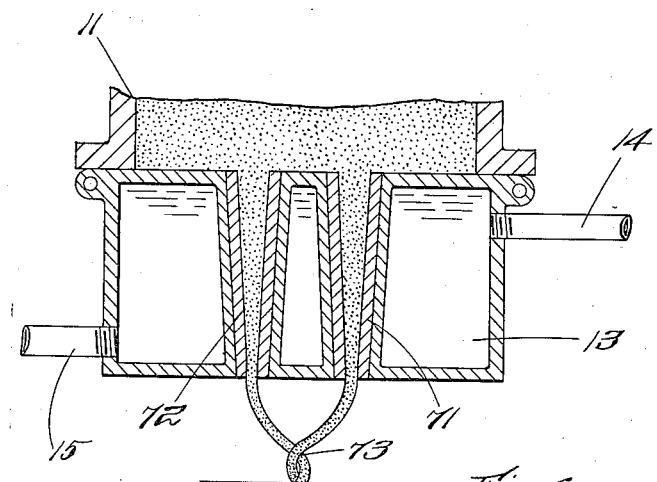
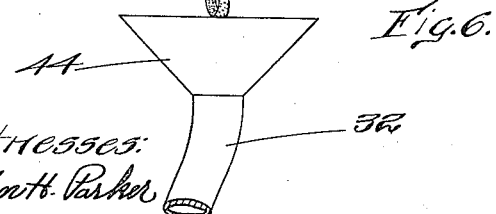
Witnesses:
John H. Parker
Jessie E. Morrison
Inventor:
William B. Laskey,
by Macleod, Calver, Copeland & Hornbeck
Attorneys.

UNITED STATES PATENT OFFICE.

WILLIAM B. LASKEY, OF MARBLEHEAD, MASSACHUSETTS.

CANDY-MAKING MACHINE.

1,142,893.     Specification of Letters Patent.     Patented June 15, 1915.

Application filed April 5, 1912. Serial No. 688,610.

*To all whom it may concern:*

Be it known that I, WILLIAM B. LASKEY, a citizen of the United States, residing at Marblehead, county of Essex, State of Massachusetts, have invented a certain new and useful Improvement in Candy-Making Machines, of which the following is a specification, reference being had therein to the accompanying drawings.

My invention relates to a new and improved machine for shaping and forming candy and particularly twisted candy.

The kind of candy intended to be produced by the machine hereinafter described is particularly hard candy, so-called, twisted into a spiral form and cut into short lengths; however, other forms of candy may be produced by my machine.

Heretofore in the manufacture of candy of this kind it has been customary to pull the candy, and, while it is still hot and before it has been allowed to cool at all, to draw the candy out in front of a fire to keep the candy from cooling during the drawing process, then to twist it without allowing the temperature to be lowered and then to cut it into pieces of proper lengths. In other words, it has been essential to allow the candy to cool the least possible amount after being pulled until it is finished, and the heat derived from the fire serves to prevent cooling and does not raise the temperature of the candy. It has therefore been necessary to perform the various steps in rapid succession and in the presence of considerable heat to prevent the candy cooling because if the candy is allowed to cool to any perceptible amount and the attempt is then made to draw it out even in the presence of outside heat, the candy will grain or sugar. Furthermore, to get an even spiral, it has been necessary that the temperature of the candy should be uniform throughout the length of the piece being twisted. The work of drawing out the candy was performed by hand and was laborious and required a high degree of skill. As a result of all these conditions, this kind of candy has been unduly costly.

I have found that candy may be allowed to cool to quite a low temperature after being pulled and even then may be drawn out, shaped or twisted as required, if the candy is drawn out by being forced through properly shaped dies or nozzles under high pressure and as it passes through the nozzles is suddenly warmed. The candy as it emerges from the nozzles is soft enough to be twisted, or otherwise shaped, as required. It is then quickly chilled and cut into short pieces.

The candy made as described herein has a peculiar silky luster not possessed by candy made in the usual manner. This luster improves the appearance of the candy.

The invention will be fully understood from the following description taken in connection with the accompanying drawings, and the novel features will be pointed out and clearly defined in the claims at the close of the specification.

In the drawings,—Figure 1 is a side elevation, partly in section, of a machine embodying my invention. Fig. 2 is a section on line 2—2 of Fig. 1 looking down. Fig. 3 is a longitudinal section on an enlarged scale of one of the nozzles. Fig. 4 is a section on line 4—4 of Fig. 3. Fig. 5 is an elevation of a piece of twisted candy made with the nozzle shown in Fig. 3. Fig. 6 is a section showing a modification of the machine for use in making a two-strand twisted candy.

Referring now to the drawings and more particularly to Fig. 1: There is shown at 11 a cylinder, within which the candy is received, being inserted therein through the opening 12 in the upper part of the cylinder. The candy when placed in the cylinder 11 has been previously pulled to the proper consistency in the well known manner, either by hand or machine, and is placed in the cylinder while still hot. Although it is preferable that the candy should cool as little as possible, nevertheless if manipulated as herein described it may be successfully worked without graining even though cooling has taken place beyond the point at which it can be manipulated at all by hand.

To reduce the cooling and consequent danger of graining to a minimum, I surround the cylinder with a covering of asbestos or other non-conducting material. This covering or jacket 11ª of non-conducting material is shown in section in Fig. 1. At the bottom of the cylinder 11 is located a water jacket 13 which closes the discharge end of the cylinder and against which the candy may come in contact, said jacket being connected by pipes 14 and 15 with some suitable source of water supply so that water at a temperature of about 165 degrees may be caused to circulate through the same. Surrounded by the water jacket, is a nozzle 16 (see also Figs. 3 and 4) the orifice 163 of which is of any desired shape, so that the candy when forced out through this orifice will be formed into a strand having a cross-section corresponding with the shape of the orifice 163.

The discharge nozzle or die 16 is preferably surmounted throughout its length by the water jacket in which said nozzle is seated so that it will be well heated and will thus heat the candy effectively, although only momentarily, at its time of discharge.

The nozzle 16 is removable, being tapered and fitting a tapering socket 162 in the water jacket 13 so that it may be quickly and conveniently changed by being knocked up out of the socket and another nozzle substituted for it.

The nozzle 16 has a gradually tapering circular bore shown at 161 so that the candy in passing from the cylinder 11 to the orifice 163 is subjected to the heat of the water contained in the water jacket 13 and the temperature of the candy is suddenly raised.

The candy is forced through the nozzle by being subjected to a heavy pressure by means of the piston 18 having a screw-threaded piston rod 19.

The top of the cylinder is closed by a cap 20 screwed into said cylinder and in which is rotatably mounted a nut 21 overlapping the cap 20 on its under side to form a thrust bearing. If desired, balls 22 may be employed to reduce the friction.

To the upper end of the nut 21, is secured a bevel gear 23 driven by another bevel gear 24, which is itself rotated by a pair of reducing gears 25 and 26, the latter being mounted on the main shaft 27 of the machine, said main shaft being driven by a driving pulley 28 and belt 29.

The screw-threaded piston rod 19 is held from rotating in some convenient manner, as, for instance by having its upper end bent at right angles and provided with a roller 30 running in ways 31 secured to the frame of the machine.

Beneath the nozzle 16, is located the twister which consists of an off-set tube 32 rotatably mounted in the frame of the machine. The twister 32 is rotated by a pair of bevel gears 33 and 34 driven by the belt 35 engaging a grooved pulley 36 on the shaft 37. The belt 35 runs on a similar grooved pulley on a shaft 39. This shaft is provided with a series of step-pulleys 40 corresponding with another series of step-pulleys 41 on the main shaft 27. These parts together with a belt 42 constitute a change speed gear by means of which the number of rotations of the twister, relative to the main shaft, may be varied as desired. By changing the speed of the twister, the number of twists per unit of length of the candy may be varied since the candy emerges from the nozzle at a substantially uniform speed for any given speed of the main shaft.

The speed of rotation of the twister will preferably be so proportioned to the speed of travel of the candy strand emerging from the discharge die or nozzle 16 under the influence of the piston 18 that the twisting operation will tend to draw out the strand somewhat, as I have discovered that by drawing out the strand at this point there is a gloss or silky luster left on the candy which is very desirable and which enhances its saleability. In other words, the twisting mechanism has the effect of pulling the candy as well as twisting it, and therefore gives the candy a desirable silky luster, and this may be varied by varying the speed of rotation of the twister with relation to the speed of movement of the piston 18 in the candy-receiving cylinder by the variable belt gearing just above referred to. It will thus be understood that this variable gearing is desirable and important.

The twister tube 32 is bent or off-set slightly, as shown at $a$, in Fig. 1, the amount of the off-set being conveniently about the diameter of the tube. The bend $a$ of the twister is preferably counterbalanced by a rod 43 secured to the side thereof, the object being to reduce as far as possible the vibration resulting from the rapid rotation of the unsymmetrical twister tube. The upper end of the twister is provided with a funnel 44 so that the orifice of the nozzle 16 may be placed, if desired, to one side of the center line of the twister.

I have found that the rotation at uniform speed of the off-set tube 32 imparts to the candy, as it emerges from the nozzle 16, a spiral of remarkable regularity. The twisting takes place just as the candy emerges from the orifice of the nozzle 16 because that is the point at which the candy is softest and therefore affords least resistance to the twisting action. The candy is preferably exposed to the air as it emerges from the orifice and may even be subjected to a blast of air from a fan or the like, in the well known manner, if it is found desirable to cool the candy more rapidly than naturally results. After being twisted the candy passes down the twister tube 32, which is preferably provided with a straight portion $b$ of some considerable length between the point where the twisting takes place and the cutting point so that there will be a strand of candy hanging from the orifice having sufficient weight to tend to draw out the candy from the orifice. By this arrangement the candy is kept moving continuously through the tube, and danger of sticking is reduced to a minimum. The candy is cut into pieces at the point $c$ in the tube and the pieces of candy fall through an extension $d$ of the twister tube into a V-shaped trough 45 and said V-shaped trough being inclined so that the pieces of candy will slide down it one at a time. The trough is preferably caused to vibrate in some well known manner as for instance by an eccentric 201. While in this trough, the pieces of candy are preferably subjected to a blast of cold air sufficient to chill the candy ready for shipment.

The cutting mechanism for severing the pieces of candy from the strand must be of a peculiar construction because a quick, sharp blow is necessary to cut the candy cleanly without splintering it, and the knife by which the cutting is done must be instantly removed from the path of the candy so that the candy, as its descends, will not rest on the knife and be distorted. The cutter consists of a series of knives 46 secured to the periphery of a wheel 47 termed the cutter wheel, loosely mounted on a shaft 48. These parts are seen in plan in Fig. 2. The shaft 48 is given a rotation at constant speed by means of a worm 49 and gear 50, which are themselves driven by a belt 51 on a pulley 52, said belt being operated from a pulley 53 on the shaft 37 which drives the twister. One or more change pulleys 54, 55 are also provided so that the speed of rotation of the cutter relative to the twister may be varied as desired. This changes the length of the piece of candy by changing the number of cuts made per unit of length of the candy, since the candy descends at a substantially constant speed, Adjacent to the cutter wheel 47, to which the knives 46 are secured, is located a wheel 61, termed the pin wheel, which is fast to the cutter-shaft 48. From the face of this wheel 61 projects a series of pins 62. These pins project through the spaces between the spokes of the cutter wheel so that the cutter wheel, which is loose on the cutter shaft, may revolve relatively to the pin wheel 61, a distance equal to the distance between two spokes of the cutter wheel. A spiral spring 63 surrounds the hub 64 of the cutter wheel and has one end fast to the hub 64 and the other end fast to the cutter shaft 48.

At 56 (see Fig. 2), is pivoted a yielding stop, one arm 57 of which is normally in the path of movement of the knives 46, while the other arm 58 is acted upon by a spring 59. This spring 59 holds the stop in the path of the knives 46, and holds the cutter wheel stationary until the pins on the pin wheel strike the spokes of the cutter wheel and overcome the resistance of the spring 59 moving the stop out of the path of the knife. When the stop 57 moves out of the path of the knife, the spring 63 moves the cutter wheel and knives forward suddenly until the pins 62 contact with the spokes of the cutter wheel. This rapid movement of the cutter wheel causes one of the knives to pass rapidly through the slot $c$ in the twister tube and strike the strand of candy the quick, sharp blow necessary to sever the candy cleanly. The knife is also not in the path of the candy except momentarily and therefore the candy cannot rest on it and be distorted.

While I have shown in Figs. 3 and 4 a nozzle having a triangular orifice, it will be understood that an orifice of any desired shape may be employed, although the triangular one is that naturally employed in the manufacture of spiral candy. It will also be understood that by disengaging the gears 33, 34, which drive the twister, the twister will remain stationary and the candy will then be cut into straight pieces not having a spiral form. In this case, an orifice of different shape to give to the candy an ornamental appearance may be employed.

Under some circumstances it may be desirable to form the candy into two or more strands which are twisted together. In this case, the water jacket is provided with the requisite number of nozzles of the desired shape. In Fig. 6, there is shown a water jacket having two nozzles 71 and 72 for the formation of a two-strand twisted candy, as seen at 73.

While I have described herein the twister actually employed by me which is the off-set or bent or eccentric tube, I am aware that many equivalent devices may be used in its place since it is only essential that one end of the candy (i. e. at the nozzle) be fixed, and that a portion of the strand of candy below the nozzle be caused to rotate eccentrically of the line of longitudinal movement of the strand of candy as an axis of rotation.

In the use of my machine the candy which has been pulled, to give it a suitable grain, is placed in the cylinder 11 while still warm and somewhat plastic, and is kept from becoming cold and brittle by the non-conducting covering and protecting jacket 11$^a$. The lower or discharge end of the cylinder 11 is closed by the water jacket so that the candy at said discharge end comes in contact with said jacket and is somewhat heated just before it enters the die or discharge nozzle seated in and surrounded throughout its length by said jacket. Thus the candy will be heated to the desired softening point only momentarily and at or near its point of discharge. If the temperature of the candy were raised by heating the cylinder 11 throughout, by surrounding the same with a heating jacket, the grain of the candy, due to the pulling operation, would be destroyed by the continued high temperature to which the candy would be subjected.

So far as I am aware, hard candy of the kind described has always been made by hand. Therefore, I believe my invention to be a broad one, and that it is capable of many modifications all within the spirit of the invention.

I believe that the process or method of making candy which has been described herein incidentally to the description of the machine embodying my invention and claimed herein is a novel process or method, and accordingly I do not waive my right to make application at some subsequent time for a patent covering the same.

What I claim is:—

1. In a candy-forming machine, the combination with a candy-receiving cylinder provided with a discharge nozzle, and means for heating said nozzle so that the candy will be heated only at or near its point of discharge, of a screw-operated piston for forcing the candy through said nozzle, a rotary nut for imparting a feeding movement to said piston, a gear wheel for rotating said nut, and a driving shaft operatively connected with said gear wheel.

2. In a candy-forming machine, the combination with a candy-receiving cylinder provided with a discharge nozzle, and means for heating said nozzle so that the candy will be heated only at or near its point of discharge, of a screw-operated piston for forcing the candy through said nozzle, a rotary nut for imparting a feeding movement to said piston, a gear wheel for rotating said nut, a driving shaft operatively connected with said gear wheel, a rotary offset twisting tube arranged below said nozzle, and gearing connecting said tube with said driving shaft.

3. In a candy-forming machine, the combination with a candy-receiving cylinder provided with a discharge nozzle, and means for heating said nozzle so that the candy will be heated only at or near its point of discharge, of a screw-operated piston for forcing the candy through said nozzle, a rotary nut for imparting a feeding movement to said piston, a gear wheel for rotating said nut, a driving shaft operatively connected with said gear wheel, a rotary offset twisting tube arranged below said nozzle, gearing connecting said tube with said driving shaft, and means for varying the speed of rotation of said twisting tube with relation to the speed of rotation of said driving shaft and consequently with relation to the speed of travel of said piston.

4. In a candy forming machine, the combination with a candy-receiving cylinder, of a heating jacket closing the discharge end of said cylinder and against which the candy in the said discharge end will come in contact, a forming nozzle surrounded throughout its length by said jacket, so that the candy will be heated at the discharge end only of said cylinder, and means for forcing the candy from the chamber of said cylinder through said nozzle.

5. In a candy forming machine, the combination with a candy-receiving cylinder, of a heating jacket closing the discharge end of said cylinder and against which the candy in the said discharge end will come in contact, a forming nozzle surrounded throughout its length by said jacket, so that the candy will be heated at the discharge end only of said cylinder, means for forcing the candy from the chamber of said cylinder through said nozzle, and means for twisting the candy after it emerges from said nozzle.

6. In a candy forming machine, the combination with a candy-receiving cylinder provided with a non-conducting covering or jacket, of a heating jacket closing the discharge end of said cylinder and against which the candy in the said discharge end will come in contact, a forming nozzle surrounded throughout its length by said heating jacket, so that the candy will be heated at the discharge end only of said cylinder, and means for forcing the candy from the chamber of said cylinder through said nozzle.

7. In a candy forming machine, the combination with a candy-receiving cylinder provided with a non-conducting covering or jacket, of a heating jacket closing the discharge end of said cylinder and against which the candy in the said discharge end will come in contact, a forming nozzle surrounded throughout its length by said heating jacket, so that the candy will be heated at the discharge end only of said cylinder, means for forcing the candy from the chamber of said cylinder through said nozzle, and means for twisting the candy after it emerges from said nozzle.

8. In a candy-forming machine, the combination with a candy receptacle provided at its discharge end with a heating jacket, of a discharge die or nozzle seated in said jacket and surrounded throughout its length by said jacket, so as to be effectively heated.

In testimony whereof I affix my signature, in presence of two witnesses.

WILLIAM B. LASKEY.

Witnesses:
 GEORGE P. DIKE,
 ALICE H. MORRISON.